United States Patent

Parada et al.

Patent Number: 5,922,387
Date of Patent: Jul. 13, 1999

[54] METHOD OF MAKING DRIED EXTRUDED GNOCCHI

[75] Inventors: Maya Parada; James Francis Santagata, both of Brooklyn, N.Y.

[73] Assignee: Lipton, Englewood Cliffs, N.J.

[21] Appl. No.: 08/738,291

[22] Filed: Oct. 25, 1996

Related U.S. Application Data

[51] Int. Cl.⁶ ....................................................... A23L 1/16
[52] U.S. Cl. ........................ 426/557; 426/451; 426/516; 426/549; 426/550
[58] Field of Search .................................. 426/549, 557, 426/550, 451, 516, 446, 448

[56] References Cited

U.S. PATENT DOCUMENTS

| | | | |
|---|---|---|---|
| 3,846,563 | 11/1974 | Cunningham | 426/557 |
| 4,517,215 | 5/1985 | Hsu | 426/557 |
| 5,299,157 | 3/1994 | Birch et al. | 426/564 |
| 5,508,053 | 4/1996 | Villota et al. | 426/557 |

FOREIGN PATENT DOCUMENTS

| | | | |
|---|---|---|---|
| 0 339784 | 12/1993 | European Pat. Off. | |
| 33911649 A 1 | of 1990 | Germany | |
| S60-126041 | 7/1985 | Japan | |

OTHER PUBLICATIONS

"Sunset Italian Cook Book", Jerry Anne DiVecchio, p. 39, Feb. 1975.

"*The New Basic Cookbook*" by Julie Rosso and Sheila Lujins, Workman Publishing, New York, NY (1988) on p. 63.

"*The Classic Italian Cookbook*" published by Alfred A. Knopf, New York (1983), p. 195.

"*Cooking A to Z*" by the California Culinary Academy, published by Ortho Books, Editor Jane Korn, 1998, pp. 189 and 190.

*New York Times Heritage Cookbook* published by GP Putnam & sons, New York, 1972, p. 723.

*Primary Examiner*—Lien Tran
*Attorney, Agent, or Firm*—James J. Farrell

[57] ABSTRACT

A partially cooked rapidly rehydratable dried food product prepared from a blend of selected flour and selected potato solids which blend resembles traditional gnocchi and a method for its preparation is disclosed.

4 Claims, No Drawings

METHOD OF MAKING DRIED EXTRUDED GNOCCHI

BACKGROUND OF THE INVENTION

This invention relates to novel dried and extruded forms of potato gnocchi which are storage stable but which exhibit rapid cook-up and hydrostability and give a flavor, odor and texture consistency similar to traditionally prepared potato gnocchi.

DESCRIPTION OF THE ART

Traditional gnocchi is a relatively thick potato flour mixture or potato pasta in the general shape of a cowrie sea shell prepared by many different methods. It is usually prepared as a fresh or frozen product which is made with mashed potatoes. In the literature dried potato pasta is mentioned which is prepared from dough containing potato starch or fresh ground potatoes.

"The New Basic Cookbook" by Julie Rosso and Sheila Lukins, Workman Publishing, New York, N.Y. (1988) on page 63 describes a method of preparing gnocchi using boiled potatoes and as little flour as possible.

"The Classic Italian Cookbook" published by Alfred A. Knopf, New York (1983) describes on page 195 a method for making potato gnocchi using 1½ pounds of boiled potatoes and 1 cup of all purpose flour.

In "Cooking A to Z" by the California Culinary Academy, published by Ortho Books, Editor Jane Korn, 1988, on pages 189, 190, recipes for gnocchi are disclosed which employ about 2 pounds of old Idaho baking potatoes and 1½ cups of flour.

The New York Times Heritage Cookbook published by GP Putnam & Sons, New York, 1972, on page 723 describes potato gnocchi. These are made from 6 large boiled potatoes and 4 cups flour. Baking powder is also added to provide lightness to the finished product.

Generally then the traditional method of preparing gnocchi appears to be using about 1.5 parts of potato (at 80% $H_2O$) to 1 part of soft wheat flour (at~14% $H_2O$) plus other ingredients, kneading the resulting dough, shaping the dough into relatively thick seashell shapes and cooking.

In addition to traditional gnocchi preparation, Japanese patent application JP S60-126,041 to Nitto Powder Company Ltd. discloses a method of producing coarsely textured, fast cooking noodles by combining a starting powder, which may be a variety of flours, with coarse potato flakes obtained from dried mashed potatoes. The amount of potato flakes used is 1 to 15%, preferably 2 to 10% by weight of the starting powder. The noodles use only small amounts of coarse potato flakes to produce a porous texture and the combination is mixed so that coarse potato flakes remain as particles in the mixture. A maximum of 15% potato is used to avoid a potato taste and odor and to prevent the product from becoming difficult to handle and the strands from breaking easily.

German Patent DE 3,911,649 A 1 (1990) employs potato starch with wheat flour and selected living cultures such as whey containing milk protein to prepare pasta.

EP 0 339 784 B1 deals with potato starch in a souffle product.

U.S. Pat. No. 5,229,157 discloses aerated vegetable products.

U.S. Pat. No. 5,508,053 discloses the production of vegetable pasta containing up to about 15 weight percent vegetable solids.

The product of this invention is a dried extruded food product shaped in a thin gnocchi or ovoid shape. This product contains a very high percentage of potato to give a traditional gnocchi flavor, odor and texture but is nevertheless capable of being dried and will easily rehydrate upon cooking to yield a pleasant tasting product that retains its dried shape.

Traditional gnocchi is prepared in an extremely thick pasta shape usually with a 0.250 to 0.500 inch wall thickness so that the gnocchi maintains its integrity during cooking. Due to the thickness, it cannot be easily dried without producing case hardening (crusted surface, wet inside). The thick shape of traditional gnocchi upon drying produces internal stress which causes the individual portions to become checked throughout and/or gummy and wet inside and misshapen. The inventive product has a wall thickness of about 0.020 to 0.080 inches but it is preferred to have at least 0.030 inches to achieve proper texture and no greater than 0.06 inches to achieve easy drying.

The product of the invention, by employing selected amounts of potato in relation to flour, and then extruding and drying produces a relatively thin product which nevertheless tastes like gnocchi, retains its shape and has the eating texture of gnocchi upon cooking.

If traditional gnocchi were to be dried it would be unsightly because of its thickness and would either take a long time to dry, producing case hardening or would fall apart on cooking because it would have no structure to retain its shape. On the other hand if traditional gnocchi were to be made thinner it would not retain its shape.

Thus, it is necessary to carefully balance the amount of potato and flour used and the overall temperature of extrusion of about 70° F. to 140° F. and preferably about 85° F. to 110° F. with a sufficient amount of extrusive force about 300 to 1500 psi, preferably about 500 to 1000 psi, to produce a structure which allows the items to be made, This balance of materials and processing also enables the product to be dried and so the amount of water employed is also important. As a further requirement traditional gnocchi requires freezing or refrigeration for storage Accordingly it is an object of the invention to produce dried gnocchi having good room temperature shelf storage stability which will taste like traditional gnocchi, and upon cooking have the cooked texture of traditional gnocchi. This object is accomplished with the advantage that a dried gnocchi is produced without the unaesthetic consequences of simply drying traditional gnocchi. Additionally, freezing or refrigeration as would be required with traditional gnocchi is no longer necessary.

Another object is to produce dried gnocchi which can easily be rehydrated within a few minutes by cooking.

Yet another object of the invention is to provide a method of preparing gnocchi including:

(1) blending flour, potato solids, and water to form a homogenous paste with a water content of about 28 to about 35 weight percent, wherein the flour has a minimum average protein content between about 12 to about 13.5 weight percent:

(2) extruding the homogenous paste to form gnocchi extrudates; and (3) drying the pasta-shaped extrudates under controlled temperature and humidity conditions, whereby gnocchi is obtained with a moisture content of about 5 to about 13 weight percent and potato solids content of about 25 to about 55 weight percent, wherein the gnocchi has, after processing and subsequent cooking, good color, texture, integrity, and potato flavor.

Still another object of this invention is to provide a method of preparing a thin-walled gnocchi potato pasta containing about 25 to about 55 weight percent solids, said method comprising:

(1) blending flour, potato and water to form a homogenous paste with a water content of about 28 to about 35 weight percent, wherein the flour is a blend of about 50 to about 100 weight percent durum flour and about 0 to about 50 weight percent hard white flour and has a minimum average protein content between about 12 to about 13.5 weight percent:

(2) extruding the homogenous paste to form thin-walled, pasta-shaped extrudates: and (3) drying the thin-walled, pasta-shaped extrudates under high temperature and low relative humidity conditions, wherein (a) the thin-walled gnocchi extrudate is first dried at a temperature of about 115° F. to about 135° F., and a relative humidity of about 25 to about 40 percent for a time sufficient to form a first partially-dried, thin-walled pasta with a moisture content of less than about 22 to 25 weight percent, (b) the first partially-dried, thin-walled potato pasta is then dried at a temperature of about 155° F. to about 180° F., and a relative humidity of about 25 percent for a time sufficient to form a thin-walled potato pasta with a moisture content of about 5 to about 13 weight percent.

These and other objects of the invention will become clear in view of the ensuing specification and examples.

SUMMARY OF THE INVENTION

Dried gnocchi pieces or units are prepared by mixing selected amounts of potato flakes, about 25–55% and durum flour, about 45–75% together with enough added water to form a homogeneous dough having about a 30% moisture content. Additional flavoring components may be included if desired. The flour employed typically has an average minimum protein content of greater than about 12 weight percent and preferably in the range of about 12 to 13.5 weight percent. The homogenous dough or paste is then extruded to form gnocchi-shaped extrudates. For purposes of this invention, the terms "gnocchi-shaped extrudates" or "extrudates" are intended to include both three-dimensional shapes formed with conventional extrusion techniques and dies of appropriate shape as well as thin sheets formed using conventional roller-type pasta makers and strips or other shapes cut from such thin sheets. The extrudates are dried under high temperature.

By employing the precise combination of potato flakes, flour and water and extruding the mixture at the appropriate screw speed and temperature, a matrix of the flour gluten is formed which incorporates most of the potato flakes, Dry gnocchi units prepared with a ground potato flakes/wheat flour combination imitate the ethnic Italian fresh potato dumpling known as gnocchi. Extruded gnocchi cook in about half the time of a regular semolina dried pasta of the same thickness. Complete rehydration is accomplished in less than about ten minutes. They have a distinct, pleasant potato flavor and a similar, however, more tender texture than regular pasta.

It has been found that potato flour cannot be used in place of ground potato flakes, since potato flour yields an inferior product. The product of the invention is a potato flavored unit similar to a fresh gnocchi product, which has a tender, chewy bite and cooks within about 10 minutes.

A typical pilot plant run is processed as follows:

In a large Hobart mixer (50 lbs. capacity) dry wheat flour and dry potato flakes are blended for 5 to 10 min. Water is then added with continued blending until the water content reaches about 30.0% to 35.5%. The dough is then loaded into a hopper and extruded through a gnocchi shaped die. The extruded product is dried in a batch dryer at 120° F. Dry Bulb/100° F. Wet Bulb temperature for about 7 hours down to about 6.5–7% moisture, or about 3 hours down to about 9–11% moisture.

A typical plant run is processed as follows:

Durum wheat flour and ground potato flakes are metered in a continuous manner into a pasta press mixer. Water is also added continuously to create a dough with about 28.0% to 34% moisture content. The dough is extruded through a gnocchi shaped die, cut to the desired length and the product is conveyed onto a continuous belt dryer where it is dried under controlled conditions to the desired moisture content.

It is theorized that the combined dried gnocchi product of the invention contains at least about 8% of total wheat proteins. The wheat proteins are about 80 to 85% wheat gliadins and glutenins. Upon and mixing, the wheat proteins form a gluten complex. This complex is believed to form a matrix having homogeneously dispersed in it potato starch and wheat starch.

INGREDIENTS:

1. Extra Fancy Flour (Durum wheat).

Durum wheat produces the best quality potato pasta in terms of cooked texture and piece integrity. It is also possible to use blends of durum flour 50–100% and hard white flour 0–50%, but 100% durum is preferable. Semolina flour is not suitable because with its larger particle size it is much slower to absorb water during the dough making than the porous potato flakes, and it makes a rough product which occasionally contains streaks of unhydrated dough.

High quality, wheat-based flours with mixograph values above 6 and a falling number targeted at about 400 (at least 350 minimum) are preferred in the practice of this invention. Mixograph values are a measure of gluten strength. Values of about 1 to 3 correspond to weak gluten and about 5 to 8 correspond to strong gluten. The falling number correlates with alpha amylase activity and is a good indicator of sprout damage. High alpha amylase activity in pasta products increases cooking losses. Higher amounts of reducing sugars in the raw flours and in the final product will result in softer textural characteristics in the cooked product. The flour should be of the glutinous type and have a minimum average protein content of about 12 to about 13.5 weight percent and preferably a minimum protein content of about 13 to about 13.5 weight percent. Preferred wheat-based flours comprise 100 percent durum flours, blends of about 50 to about 100 parts by weight durum flour and 0 to about 50 parts by weight hard white flour. Limited amounts of pertinacious materials such as egg albumin or soy isolates can be incorporated into the blend to modify textural properties if desired. Especially preferred wheat-based flours include 100 percent durum flours wherein the flour has a minimum average protein content between about 13 to about 13.5 weight percent. Generally flours having a granulation size such that about 98 percent minimum pass through a U.S. standard No. 70 sieve are acceptable. Preferred are flours leaving only a trace on a U.S. Standard No. 100 sieve.

Sufficient potato solids and water are added to, and blended with, the flour using conventional pasta-making equipment or mixers to produce a paste of the desired water and solids content. The water content of the paste should be adjusted to allow for the formation of suitable extrudates which will retain the desired shape until that shape is set or hardened in the initial portion of the drying process. Generally, water levels in the range of about 28 to about 33 weight percent are acceptable. The potato solids must initially be in the form of flakes.

2. Potato Flakes (Produced, for example. by the Nonpareil Co. located in Idaho).

Any size flakes can be used, however, the larger flakes are very bulky, do not mix uniformly with durum flour due to a large density differential (0.567 g/cc for flour vs. 0.207 g/cc for large flakes). Further the large flakes are expensive to transport per pound of product, and break up to form smaller flakes during the mixing of dough and pasta extrusion. Ground potato flakes, 100% of which pass through a U.S. mesh #30 and 0.5% through a U.S. mesh #50 and have a 0.48 g/cc density work much better. Flakes passing through a U.S. mesh #50 lose their cell structure, and produce undesirable pastiness and loss of aesthetic quality in the rehydrated product. Potato flakes may also contain mono- and diglycerides as processing aids, about 0.3 to 0.5%, and preservatives, such as Sodium Acid Pyrophosphate, 800 ppm wax, Citric Acid, 70 ppm max, or, optional, Sodium Bisulfite. The preservatives are used to prevent discoloration of the potato during dehydration and storage due to non-enzymatic browning. Non-enzymatic browning is due to the presence of reducing sugars and free amino acids in raw potato.

3. Use of egg is optional. The addition of egg does produce a better quality pasta in terms of shape stability and texture, especially egg white, but increases the cost.

PROCESS DESCRIPTION

Once the homogenous paste is formed, the paste is extruded or otherwise shaped using conventional pasta making techniques. For example, the homogenous paste can be forced through the holes of an extruder die or can be pressed between rollers to obtain the desired shape. Extrudates formed using an extruder die can be cut to the desired length. Extrudates formed using rollers will be in the form of thin sheets which can then be cut into thin strips and to length before further processing. All conventional pasta shapes can be used in the practice of this invention including, for example, spaghetti, vermicelli, fettucini, linguine, ziti, elbow spaghetti, orzo, shell, elbow macaroni, rigatoni, macaroni, twist rings, mafalda, alphabets, lasagna, spirals, manicotti, noodles, children's shapes such as teddy bears and the like. Thin-wall extrudates or pasta shapes are, however, especially preferred since they generally require shorter drying times. For purposes of this invention, "thin wall" means a wall thickness of about 0.02–0.08 inches preferably in the range of about 0.03 inches to about 0.06 inches.

Once formed, the pasta-shaped extrudates of this invention are dried under controlled conditions using high temperature and low relative humidity to produce a dried pasta with a moisture content of about 5 to about 13 weight percent and which has good color, texture, and integrity. For purposes of this invention, "low relative humidity" is intended to mean a relative humidity in the range of about 25 to about 65 percent during the peak drying period, preferably in the range of about 25 to about 40 percent. For purposes of this invention, the "peak drying period" is that portion of the drying profile wherein the majority of the drying takes place; normally the peak drying period includes the initial and middle portion of the drying profile (i.e., at elevated temperatures) but generally does not include the final cool down portion at the end of the drying profile. It is important that the extrudates to be dried have an initial moisture content of at least 28 weight percent and preferably about 29 to about 33 weight percent. If the initial moisture content is too low, i.e., less than 28 weight percent, or if the relative humidity is too low, i.e., less than about 25 percent, it may be difficult to avoid significant structural damage to the final product during drying. By controlling the drying conditions, a good quality pasta can be produced without significant deterioration or destruction of the color, flavor, and nutrients associated with the potato used to prepare the pasta. The drying profiles used in this invention are designed to allow for controlled and rapid removal of the water from the pasta with minimal structural stresses to prevent or minimize cracking, checking, splitting, and blistering of the pasta shapes. The present drying process generally limits the duration of the exposure of the potato pasta to elevated temperatures while still providing a relatively crack-, check-, split-, blister-, and structural stress-free pasta product.

As noted above, the process of this invention can be implemented using conventional pasta making equipment, including convention pasta drying ovens. The drying ovens must, of course, be capable of controlling the temperature and relative humidity to which the pasta shapes are exposed as a function of time. Generally, forced air drying ovens with discrete or separate drying zones and separate temperature and humidity controls for each drying zone are preferred, Separate drying zones allow for the temperature and relative humidity to be easily varied and controlled as the pasta passes through the drying oven. Continuous, multi-conveyor belt type dryers where the pasta shapes drop from one belt to another are especially suited for the practice of this invention; the temperature and relative humidity can be controlled such that the pasta on each belt can be exposed to the desired temperature and humidity conditions. Separate drying ovens connected in series, where each oven has its own separate temperature and relative humidity controller, are generally preferred. Preferably the drying oven or ovens are forced air types which allows for better control of the humidity near the surface of the pasta shapes. Especially in the early stages of the drying process, water vapor removed from the pasta can raise the relative humidity near the pasta surface to levels higher than desired, thereby slowing down the drying process and resulting in a less desirable product. By removing this potential "layer" of high humidity near the pasta surface, the humidity can be controlled with the ranges desired in the present process. Accurate temperature and percent relative humidity must be controlled in the predryer or first drying stage to assure good quality in terms of color, flavor, nutrients, and structural integrity.

The gnocchi of this invention have good color, texture, integrity, and flavor both before and after cooking. The gnocchi of this invention also have excellent storage stability.

Potato Flakes

Ground potato flakes rather than potato flour is utilized in formulating the gnocchi product since potato flour is not suitable. The difference between potato flour and potato flakes is clearly stated in "Potato Processing" by W. Tolbert and O. Smith, published by AVI Publishing Co., 1967.

Potato flakes are prepared by washing the potatoes, peeling them by any commercially feasible process such as steam peeling, abrasion peeling or others, slicing the potatoes for uniformity of heating and cooling, precooking, cooling, then high temperature cooking, mashing, drum drying and grinding.

Potato flour manufacturing uses basically the same steps except for the steps of precooking and cooling prior to high temperature cooking. These two steps which are not part of potato flour manufacture are very important in potato flake processing as explained below.

Precooking and Cooling

During precooking, raw potato slices are heated in water at a temperature high enough to gelatinize the starch within the potato cells, but below the temperature where softening of intercellular bonds takes place. Normally potato slices are immersed in water held at about 71°–74° C. for a period of about 20 minutes.

Fresh water is admitted to the precooker to cool the potatoes and remove gelatinized surface starch and a certain amount of soluble constituents of the potato.

Gelatinization of the starch within the cells must be complete after precooking so that the retrogradation can take place during cooling. The bonds thus formed retain their linkages through the cooking and drying steps which follow, thus reducing the stickiness of the reconstituted finished flake.

Potatoes that are precooked in this way are firmer and require additional steam cooking to soften them prior to mashing and dehydration. Consequently the resulting flakes can be broken to a greater degree without affecting the texture of the reconstituted product.

Cooling

In commercial practice, a screw conveyor processor is used to advance sliced potatoes through a counter-current flow of cold water. The quantity of water used depends on the water temperature, flow rate of potatoes, and the degree of retrogradation desired. High solids potatoes (S.G. 1.080) are generally cooled to a maximum internal pulp temperature of about 21° C. It is essential that lower solids potatoes (less than S.G. of 1.080) be cooled to about 10° C. internal temperature, which in some cases has required the use of refrigeration. Thus, appropriate cooling must be balanced with the type of potato used to achieve appropriate retrogradation of starch.

A. Potato flour product is very different from dried flakes. Potato flour does not use a precooking and cooling step to prepare it. Potato flour is prepared by simply thoroughly cooking the potatoes, mashing and then drying them. There is no attempt to retain the structure as there is with dried potato flakes.

As a result, potato flakes retain their cellular structure and upon reconstitution produce a fresh cooked mashed potato like texture.

Potato flour produces a pastier and stickier product due to free starch released upon rupturing of the potato cells. This makes potato flour unsuitable for preparation of the inventive composition.

Chemical additives such as sodium acid pyrophosphate and citric acid are frequently added to potato in the process before drying. They are necessary to prevent non-enzymatic browning and oxidative deterioration.

Having generally described various aspects of the present invention, the invention will now be more particularly described with reference to the following specific examples. The following examples are designed to illustrate, but not to limit, the practice of the instant invention. Unless otherwise indicated, all percentages are by weight.

EXAMPLE 1

Several doughs containing various compositions of flour and flour combined with potato solids were used to prepare dried pasta. This pasta was cooked and tested for texture and cooking time.

A. Semolina dough was made as standard pasta using 100% semolina thoroughly mixed with enough water to make a 30% moisture dough. This dough was extruded through a gnocchi die of 0.032 inches.

B. The extra fancy dough was made as above with 100% durum flour and processed as above.

C. The 10% potato sample was made with 10% large potato flakes and 90% durum flour. The flour was treated as in Example 1A above.

Samples D through G were prepared in the same manner with different amounts of potato and in the case of E the potato flakes were ground instead of remaining as large flakes. In the case of H there was a repetition of D.

Cooked Gnocchi—Texture Analysis

A test was developed to measure the degree of softness of cooked pasta units using the Texture Technology Corp. Texture Analyzer. The test is shape dependent, and was geared towards the gnocchi shape in particular.

In the test, the center strip of gnocchi is placed on a length-wise perforated plate and cut through with a probe in a shape of a dull flat rectangle. The force it takes to cut the sample is measured as a compression force in grams vs. time (i.e. compression force, grams).

The gnocchi samples measured were made in a pilot plant. All potato containing gnocchi except one sample were made using a large flake potato ingredient. One sample containing 45% potato was made with a ground flake potato ingredient.

Cooking and Sampling Procedure

All samples of gnocchi were cooked as follows:
32 oz of water
115 g of gnocchi

After the water boiled, gnocchi were added. The water was brought to boiling again (40 sec.) and cooking time was observed. The samples were removed at 3, 5, 7, 9, 11, 13 and 15 minutes, rinsed under running cold water, drained and put into plastic bags to retain freshness during testing.

RESULTS

The higher numbers are representative of firm texture and lower numbers represent softer texture.

Testing was accomplished with the following results:

TABLE 1

COOKED GNOCCHI - TEXTURE ANALYSIS

| Time, Min | Semolina Regular Pasta A | Ex. Fancy Regular Pasta B | 10% Potato C | 30% Potato D | 45% Pot. Ground E | 55% Potato F | 46% Potato G | 30% Potato H |
| --- | --- | --- | --- | --- | --- | --- | --- | --- |
| 3 | | | 163.1 | 115 | | 185.1 | 161.4 | 100.9 |
| 5 | 165.6 | | 143.4 | 88.1 | 133.8 | 103.4 | 107.2 | 77.9 |
| 7 | 173.5 | 167.5 | 119.3 | 76.5 | 111.8 | 84.7 | 82.5 | 68.8 |
| 9 | 138.7 | 145.1 | 119.1 | 69.6 | 97.5 | 72.2 | 75.9 | 62.9 |
| 11 | 133.2 | 128.4 | 109.2 | 66.3 | 95.2 | 68.2 | 68.8 | 64.4 |
| 13 | 120.2 | | | | | | 65.8 | 72.2 |
| 15 | 122.3 | | | | | | 69.7 | 69.6 |

1. Gnocchi made with potato flakes at any level of addition are significantly softer than a wheat flour/semolina product at all cooking times.

2. Gnocchi made with semolina and Extra Fancy flour have similar firm texture.

3. Gnocchi made with potato flakes added at 30 to 55% also are very similar in firmness.

4. Gnocchi made with a large flake potato ingredient are softer than when made with a small flake which may be due to a higher porosity or a different distribution of the potato ingredient.

5. After the samples were essentially cooked, their firmness did not change much during further cooking.

EXAMPLE 2 (COMPARATIVE)

An attempt was made to dry traditional gnocchi and test it for cooking quality. Traditional gnocchi were purchased at Italian specialty store manufactured by "Queen Ann Mfr.", Brooklyn, N.Y. The gnocchi were frozen.

Ingredients: flour, potato, eggs, butter, salt.

The sample was dried in an Aeroglyde tray dryer at the following conditions:
120° F. Dry bulb
100° F. Wet bulb
Drying time: 12 hrs.
Initial Moisture: 43.0%
Final Moisture: 13.1%

The dry product retained its shape and appearance on the outside, however it was darker and denser on the inside.

It was cooked in boiling water until all soft, which took over 25 minutes, yet the texture was overly soft outside and somewhat gummy inside, overall the product was judged to be unacceptable.

EXAMPLE 3 (COMPARATIVE)

Another variety of "traditional" gnocchi was purchased at Edwards supermarket the brand: "Bertagini", produced by Fabrique par F & B 50 V. le S. Agostino 21, Italy, MAP.

Ingredients: potato (60%) reconstituted from dehydrated potato, soft wheat flour, potato starch, rice flour, salt, citric acid and sorbic acid.

The sample was dried in an Aeroglyde tray dryer at the following conditions:
120° F. Dry Bulb
100° F. Wet Bulb
Drying time—6 hours
Initial Moisture—59.1%
Final Moisture—9.12%

The dry product again retained its shape and appearance on the outside. It was also light color and porous inside. Upon cooking in boiling water the sample completely fell apart after a few minutes.

EXAMPLE 4

A formulation containing the following ingredients was prepared.

| FINISHED PRODUCT WEIGHT, LBS | 30.00 | | | |
| --- | --- | --- | --- | --- |
| FINISHED PRODUCT MOISTURE, % | 6.50 | | | |
| DRY PRODUCT WEIGHT, LBS. | 28.05 | | | |
| FORMULATION | WT., % | LBS. | GMS. | DRY, LBS |
| DRY EGG WHITE SOLIDS NEEDED | 3.00 | 0.84 | 381.70 | 0.84 |
| DRY EGG SOLIDS, % MOISTURE | 4.50 | | | |
| DRY EGG SOLIDS TO ADD | | 0.88 | 399.69 | |

-continued

| | | | | |
|---|---|---|---|---|
| SALT | 1.00 | 0.30 | 136.08 | 0.30 |
| WHEAT FLOUR, AS IS % MOISTURE | 13.00 | | | |
| TOTAL DRY FLOUR SOLIDS | | | | 26.91 |
| WHEAT FLOUR TO ADD | 45.00 | 13.92 | | 12.11 |
| POTATO FLAKES, AS % MOISTURE | 7.50 | | | |
| POTATO FLAKES TO ADD ADDED WT OF DRY INGRED. AS IS | 55.00 | 16.00 | | 14.80 |
| WATER ADDED | | 15.25 | | |

COMMENTS: MAGIC VALLEY LARGE POTATO FLAKES
DRYING: DRYING @ 120° F. of D.B./100° F. OF W.B.
DIE: GNOCCHI, 0.040" THICK

The formulation was prepared as follows:

In a large Hobart mixer (50 lbs capacity) 13.92 lbs. of Extra Fancy Durum Flour, 16 lbs. of Magic Valley potato flakes, 0.88 lbs. of dry whole egg solids and 0.3 lbs. of salt are blended together for 10 minutes. Then 15.25 pounds of water at about 80° F. is added gradually to the flour with continued mixing for about 15 minutes. This brings the dough moisture up to about 31.1% $H_2O$. The dough is then added to the hopper of an Ambretti® pasta press and extruded through a gnocchi shaped die, 0.040" thick. The power utilized by the Ambretti press is 5.9 amps. Screw speed at 3.0. Barrel temp. 90° F. Extended product is loaded onto the trays of a batch Aeroglyde® drier and dried at 120° F. Dry Bulb/100° F. Wet Bulb conditions. Drying time 4 hours—final product moisture 7.43% $H_2O$.

EXAMPLE 5

A formulation containing the following ingredients was prepared.

| FINISHED PRODUCT WEIGHT, LBS | 20.00 | | | |
|---|---|---|---|---|
| FINISHED PRODUCT MOISTURE, % | 6.50 | | | |
| DRY PRODUCT WEIGHT, LBS. | 18.70 | | | |
| FORMULATION | WT., % | LBS. | GMS. | DRY, LBS |
| DRY WHOLE EGG SOLIDS NEEDED | 3.00 | 0.56 | 254.47 | 0.56 |
| DRY EGG SOLIDS, % MOISTURE | 4.50 | | | |
| DRY EGG SOLIDS TO ADD | | 0.59 | 266.46 | |
| WHEAT FLOUR, AS IS % MOISTURE | 13.00 | | | |
| TOTAL DRY FLOUR SOLIDS | | | | 18.14 |
| WHEAT FLOUR TO ADD | 25.00 | 5.21 | | 4.53 |
| POTATO FLAKES, AS % MOISTURE | 7.50 | | | |
| POTATO FLAKES TO ADD ADDED WT OF DRY INGRED. AS IS | 75.00 | 14.71 | | 13.60 |
| WATER ADDED | | 9.35 | | |

COMMENTS: NON-PAREIL POTATO FLAKES
DRYING: DRYING @ 120° F. OF D.B./100° F. OF W.B.
DIE: WAVY NOODLES, 0.040" THICK

The ingredients were processed as follows:

In a large Hobart mixer, 50 lbs. capacity, 5.21 lbs. of Extra Fancy Durum Flour, 14.71 lbs. of Non-Pareil potato flakes and 0.59 lbs of dry whole egg solids are blended for 10 minutes. Then, water at about 75–80° F. is added to the dry blend with continued mixing for about 15 minutes. A total of 9.35 pounds of water is added. The dough moisture is about 34.0%. The dough is then loaded into the hopper of an Ambretti® pasta press, and extruded through a wavy noodle shape die, 0.040" thick. Extruded product is loaded onto the trays of an Aeroglyde tray drier and dried at 120° F. Dry Bulb/100° F. wt Bulb conditions. The product is dried for 9 hours (4 hours the first day plus 5 hours the next day). Final moisture—6.65% $H_2O$.

EXAMPLE 6

A formulation containing the following ingredients was prepared.

| FINISHED PRODUCT WEIGHT, LBS | 25.00 | | | |
|---|---|---|---|---|
| FINISHED PRODUCT MOISTURE, % | 6.50 | | | |
| DRY PRODUCT WEIGHT, LBS. | 23.38 | | | |
| FORMULATION | WT., % | LBS. | GMS. | DRY, LBS |
| DRY WHOLE EGG SOLIDS NEEDED | | | | |
| WHEAT FLOUR, AS IS % MOISTURE | 13.00 | | | |
| TOTAL DRY FLOUR SOLIDS | | | | 23.38 |
| WHEAT FLOUR TO ADD | 75.00 | 20.15 | | 17.53 |
| POTATO FLAKES AS % MOISTURE | 7.50 | | | |
| POTATO FLAKES TO ADD ADDED WT OF DRY INGRED. AS IS | 25.00 | 6.32 | | 5.84 |
| WATER ADDED | | 9.65 | | |

COMMENTS: NON-PAREIL POTATO FLAKES
DIE: GNOCCHI, 0.032" THICK

In a large Hobart mixer (50 lbs. capacity) 20.15 lbs. of Extra Fancy Durum Flour and 6.52 lbs of Non-Pareil ground potato flakes are blended for 10 minutes. A total of about 9.65 lbs. of water at about 80° F. is added to the blend with continued mixing. This brings the dough moisture up to about 33.0%. The dough is then loaded into the hopper of an Ambretti® pasta press and extruded through a gnocchi-shaped die, 0.032" thick. The power utilized by the Ambretti® pasta press is 6.5 amps. Screw speed set at 2.5; Cutter speed 2.9; Barrel temp 90° F. The extruded product is loaded onto the trays of an Aeroglyde® tray drier.

Drying conditions:
120° F. Dry Bulb
100° F. Wet Bulb
Drying time after 5 hours of drying—8.81% $H_2O$.

EXAMPLE 7

In a large Hobart mixer (50 lbs. capacity) 30.9 lbs. of Extra Fancy Durum flour and 12.13 lbs. of ground potato flakes are blended for 10 minutes. A total of 14.5 lbs. of water is added gradually to the blend with continued mixing. This brings the dough moisture to about 32%. The dough is then loaded to the hopper of the Ambretti® pasta press and extruded through a gnocchi-shaped die, 0.032" thick. The temperature in the barrel is maintained at 90° F. Power at 6.5 amps.

The product is dried at 120° F. dry bulb, 100° F. wet bulb. Final product moisture 6.250%.

| | | | | |
|---|---|---|---|---|
| FINISHED PRODUCT WEIGHT, LBS | 40.00 | | | |
| FINISHED PRODUCT MOISTURE, % | 6.50 | | | |
| DRY PRODUCT WEIGHT, LBS. | 37.40 | | | |
| FORMULATION | WT., % | LBS. | GMS. | DRY, LBS |
| WHEAT FLOUR, AS IS % MOISTURE | 13.00 | | | |
| TOTAL DRY FLOUR SOLIDS | | | | 37.40 |
| WHEAT FLOUR TO ADD | 70.00 | 30.09 | | 26.18 |
| POTATO FLAKES, AS % MOISTURE | 7.50 | | | |
| POTATO FLAKES TO ADD | 30.00 | 12.13 | | 11.22 |
| ADDED WT OF DRY INGRED. AS IS | | | | |
| WATER ADDED | | | 14.50 | |

COMMENTS: NON-PAREIL POTATO FLAKES
DRYING: 120° F. OF D.B./100° F. OF W.B.
DIE: GNOCCHI, 0.032" THICK
Dough moisture 32.5%/31.6%/31/7%/32.8%
Final Gnocchi moist 6.25%

EXAMPLE 8

A typical plant run is processed as follows:

Durum wheat flour and ground potato flakes are metered in a continuous manner into a pasta press mixer. Water is also added continuously to create a dough with about 28.0% to 34% moisture content. The dough is extruded through a gnocchi shaped die, cut to the desired length and the product is conveyed onto a continuous belt dryer where it is dried under controlled conditions to the desired moisture content.
Extra Fancy Durum Flour rate 14#/min
Non-Pareil ground potato flake rate 5.64 #/min
Water 5.94#/min
Vacuum 28.8"
Dough moisture at 29.5%
Drying Conditions:
1. Preliminary dryer
   125° F.±10° F.
   33% R.H.
2. Finisher
   170° F.±10° F.
   25% R.H.
Total Drying time—10 hour
Final moisture 7.0%

This invention has been described with respect to certain preferred embodiments and various modifications and variations in the light thereof will be suggested to persons skilled in the art and are to be included within the spirit and purview of this application and the scope of the appended claims.

What is claimed is:

1. A continuous method of preparing gnocchi containing about 25% to about 55% weight percent dry basis potato solids, said method comprising:

a) blending flour, potato flakes and water to form a homogenous paste with a water content of about 28 to about 35 weight percent on a total weight basis, wherein the wheat flour has a minimum average protein content between about 12 to about 13.5 weight percent;

b) extruding the homogenous paste to form gnocchi shaped extrudates; and c) drying the gnocchi shaped extrudates, whereby a potato pasta is obtained with a moisture content of about 5 to about 13 weight percent on a total weight basis, wherein the drying step comprises:

(i) drying the gnocchi shaped extrudates in two stages;
         (a) a preliminary stage at a temperature of about 125° F.±10° F. and a relative humidity of about 33% for a time sufficient to form a partially-dried gnocchi with a moisture content of no less than about 21 total weight percent and
         (b) a finishing drying step at a temperature of about 170° F.±10° and a relative humidity of about 25% and a total drying time to achieve a final moisture content of about 5 to 13% total weight of moisture.

d) wherein the gnocchi has, after processing and subsequent cooking, good color, texture, integrity, and potato flavor.

2. A process for preparing gnocchi as defined in claim 1 comprising:

a) blending the homogeneous paste at ambient temperature for a sufficient amount of time to achieve uniform hydration; said paste containing,
      about 45 to 75% fancy flour on a dry basis;
      about 25 to 55% potato solids on a dry basis;
      about 28 to 35% water on a total weight basis to form a uniformly hydrated paste;

b) kneading the hydrated paste to achieve substantial homogeneity; and c) extruding the kneaded paste at a temperature of 80° F. to 140° F. and a pressure of 500 to 1000 psi.

3. A method as defined in claim 1, wherein the flour is selected from the group consisting of durum flour, hard white wheat flour, and mixtures thereof.

4. A method as defined in claim 1, wherein the flour comprises a blend of about 50 to about 100 percent by weight durum flour and up to about 50 percent by weight of hard white wheat flour.

* * * * *